US011962095B2

(12) United States Patent
Jang et al.

(10) Patent No.: US 11,962,095 B2
(45) Date of Patent: Apr. 16, 2024

(54) PATCH ANTENNA DESIGN FOR EASY FABRICATION AND CONTROLLABLE PERFORMANCE AT HIGH FREQUENCY BANDS

(71) Applicant: JOHN MEZZALINGUA ASSOCIATES, LLC, Liverpool, NY (US)

(72) Inventors: Taehee Jang, Fayetteville, NY (US); Niharika Tambe, Liverpool, NY (US); Jordan Ragos, Syracuse, NY (US); Niranjan Sundararjan, Liverpool, NY (US)

(73) Assignee: JOHN MEZZALINGUA ASSOCIATES, LLC, Liverpool, NY (US)

( * ) Notice: Subject to any disclaimer, the term of this patent is extended or adjusted under 35 U.S.C. 154(b) by 0 days.

(21) Appl. No.: 17/054,854

(22) PCT Filed: May 14, 2019

(86) PCT No.: PCT/US2019/032194

§ 371 (c)(1),
(2) Date: Nov. 12, 2020

(87) PCT Pub. No.: WO2019/222197

PCT Pub. Date: Nov. 21, 2019

(65) Prior Publication Data

US 2021/0218157 A1 Jul. 15, 2021

Related U.S. Application Data

(60) Provisional application No. 62/671,706, filed on May 15, 2018.

(51) Int. Cl.
*H01Q 21/08* (2006.01)
*H01Q 9/04* (2006.01)

(52) U.S. Cl.
CPC ............ *H01Q 21/08* (2013.01); *H01Q 9/045* (2013.01)

(58) Field of Classification Search
CPC ........ H01Q 21/08; H01Q 21/26; H01Q 9/045; H01Q 9/0457; H01Q 9/0407; H01Q 1/246
See application file for complete search history.

(56) References Cited

U.S. PATENT DOCUMENTS 6,342,867 B1 * 1/2002 Bell ........................ H01Q 5/42 343/797
9,722,323 B2 8/2017 Yona et al.
(Continued)

FOREIGN PATENT DOCUMENTS

CN 103840254 A 6/2014
CN 107425268 A 12/2017
(Continued)

OTHER PUBLICATIONS

International Search Report and Written Opinion dated Aug. 26, 2019, from International Application No. PCT/US2019/032194, 9 pages.
(Continued)

*Primary Examiner* — Hoang V Nguyen
(74) *Attorney, Agent, or Firm* — Meunier Carlin & Curfman LLC

(57) ABSTRACT

Disclosed is a high frequency radiator for an antenna. The high frequency radiator is formed of two interlocking PCB stems on which a radiator plate is mounted. Disposed on each of the interlocking PCB stems are two combinations of a feeder metallic trace and an opposing metallic trace, disposed on opposite sides of the PCB stem and electrically coupled together by at least one via formed in the PCB stem and a solder point within the via. This configuration of high frequency radiator is considerably cheaper to manufacture
(Continued)

compared to conventional designs and is less susceptible to impedance matching problems resulting from inconsistent solder joint dimensions.

15 Claims, 14 Drawing Sheets

(56) References Cited

U.S. PATENT DOCUMENTS

| | | | | |
|---|---|---|---|---|
| 2010/0117914 | A1 | 5/2010 | Feller et al. | |
| 2012/0032866 | A1* | 2/2012 | Chen | H01Q 9/42<br>343/846 |
| 2014/0049439 | A1* | 2/2014 | Ho | H01Q 5/364<br>343/858 |
| 2014/0139387 | A1 | 5/2014 | Jones et al. | |
| 2016/0285169 | A1* | 9/2016 | Shooshtari | H01Q 21/062 |
| 2017/0012364 | A1 | 1/2017 | Yang et al. | |
| 2018/0034165 | A1 | 2/2018 | Li et al. | |

FOREIGN PATENT DOCUMENTS

| | | | | |
|---|---|---|---|---|
| CN | 107851888 | A | | 3/2018 |
| CN | 109216911 | A | * | 1/2019 |
| JP | 2013026707 | | | 2/2013 |
| WO | 2012-102576 | | | 8/2012 |
| WO | 2016201208 | A1 | | 12/2016 |

OTHER PUBLICATIONS

Extended European Search Report dated Dec. 16, 2021 issued in related Application No. 19804318.4, 12 pages.

Office Action, dated Jan. 16, 2023, received in connection with corresponding EP Patent Application No. 19804318.4.

First Office Action and Search Report, dated Jan. 5, 2023, received in connection with corresponding CN Patent Application No. 201980046676.5. (and English translation).

Office Action, dated Aug. 1, 2023, received in connection with corresponding KR Patent Application No. 10-2020-7036061 (and English translation).

* cited by examiner

PATCH ANTENNA DESIGN FOR EASY FABRICATION AND CONTROLLABLE PERFORMANCE AT HIGH FREQUENCY BANDS

CROSS REFERENCE TO RELATED APPLICATIONS

This Application claims priority to U.S. Provisional Patent Application No. 62/671,706, filed May 15, 2018, which is hereby incorporated by reference in its entirety.

BACKGROUND OF THE INVENTION

Field of the Invention

The present invention relates to wireless communications, and more particularly, to antennas that are capable of operating in high frequency ranges.

Related Art

As mobile telecommunications advance toward the advent of 5G, increasing demands for higher datarates, enabled by carrier aggregation, are leading to exploitation of spectrum in higher frequency ranges. New 3GPP bands, such as Citizens Broadband Radio Service (CBRS) spectrum (3550-3700 MHz) and Licensed Assisted Access (LAA) spectrum (5150-5350 MHz and 5470-5925 MHz) present challenges to antenna designers and manufacturers in that radiators that perform in these bands are very sensitive to manufacturing variations. Given the shorter wavelengths corresponding to these higher frequencies, slight defects or imprecisions in solder joints or mounting of radiator plates can lead to variations that are a significant percentage of wavelength, leading to poor impedance matching.

FIG. 1A illustrates a conventional high frequency radiator 100, which includes a PCB (printed circuit board) radiator plate 110, and a passive radiator plate 120, both of which are mechanically mounted to a non-conductive support pedestal 130. PCB/radiator plate 110 is electrically coupled to four metallic pins 140, which carry the RF signal to be radiated to PCB radiator plate 110.

FIG. 1B is a cutaway view of conventional high frequency radiator 100, showing the PCB/radiator plate 110 and one of the four metallic pins 140. Metallic pin 140 is electrically coupled to PCB/radiator plate 110 at feed metal pad 160 by solder point 150, and electrically coupled to feedline 170 by another solder point. The other three metallic pins 140 are similarly coupled.

FIG. 1C is a side view of conventional high frequency radiator 100, illustrating the relative heights of PCB/radiator plate 110 and first passive radiator plate 120. Second passive radiator plate 122 or/and third passive radiator 124, which are mechanically mounted to a non-conductive support pedestal 130, may be added to get better bandwidth. From the illustration, it is apparent that solder point 150 has a height or prominence above PCB/radiator plate 110 that is a significant percentage of the distance between PCB/radiator plate 110 and passive radiator plate 120.

Conventional high frequency radiator 100 presents the following challenges. First, given four metallic pins 140, each of which are soldered at feed metal pad 160 and corresponding feed line 170, mounting each conventional high frequency radiator 100 to an antenna array face requires eight solder joints. Further, given the height or prominence of solder point 150, and given standard manufacturing variations in soldering, the height of a given solder point 150 may vary by a considerable percentage of the distance between PCB/radiator plate 110 and passive radiator plate 120. These variations in solder point 150 heights may cause considerable impedance mismatches for the conventional high frequency radiator 100. Further, since the center of plates 110/120/122/124 are mounted to a non-conductive supporting pedestal 130, they may be bent. This may cause a change in distance between PCB/radiator plate 110 and passive radiator plate 120.

In order to assemble one antenna, it requires the non-conductive supporting pedestal 130, four metallic pins 140, PCB/radiator plate 110, and at least one passive radiator plate 120, along with eight solder joints.

Accordingly, what is needed is a high frequency radiator that is less expensive to manufacture and is also substantially immune to manufacturing variations such as soldering and bent metallic patches.

SUMMARY OF THE INVENTION

An aspect of the present disclosure involves a radiator for an antenna. The radiator comprises a pair of PCB stems arranged in a cross fashion, each of the PCB stems having a front side and a rear side, wherein disposed on each PCB stem is a pair of feeder metallic traces and a corresponding pair of opposing metallic traces, wherein each combination of feeder metallic trace and corresponding opposing metallic trace is electrically coupled by at least one via formed in the PCB stem. The radiator further comprises a radiator plate that is mechanically coupled to the pair of PCB stems.

Another aspect of the present invention involves an antenna that has a plurality of high frequency radiators. Each of the high frequency radiators comprises a pair of PCB stems arranged in a cross fashion, each of the PCB stems having a front side and a rear side, wherein disposed on each PCB stem is a pair of feeder metallic traces and a corresponding pair of opposing metallic traces, wherein each combination of feeder metallic trace and corresponding opposing metallic trace is electrically coupled by at least one via formed in the PCB stem. Each of the high frequency radiators also comprises a radiator plate that is mechanically coupled to the pair of PCB stems.

BRIEF DESCRIPTION OF THE DRAWINGS

The accompanying figures, which are incorporated herein and form part of the specification, illustrate patch antenna design for easy fabrication and controllable performance at high frequency bands. Together with the description, the figures further serve to explain the principles of the patch antenna design for easy fabrication and controllable performance at high frequency bands described herein and thereby enable a person skilled in the pertinent art to make and use the patch antenna design for easy fabrication and controllable performance at high frequency bands

DESCRIPTION OF EXEMPLARY EMBODIMENTS

Figure 1A:
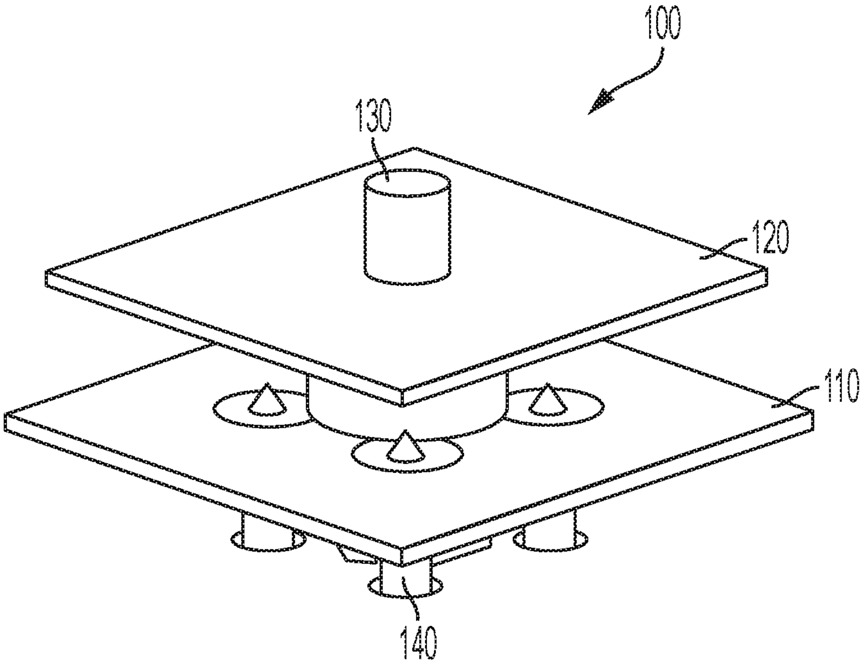
FIG. 1A illustrates a conventional high frequency radiator.
Figure 1B:
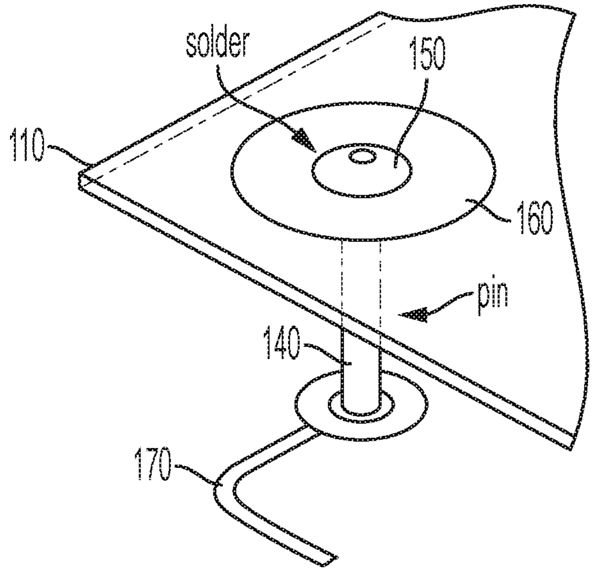
FIG. 1B is a cutaway view of the conventional high frequency radiator of FIG. 1A.
Figure 1C:
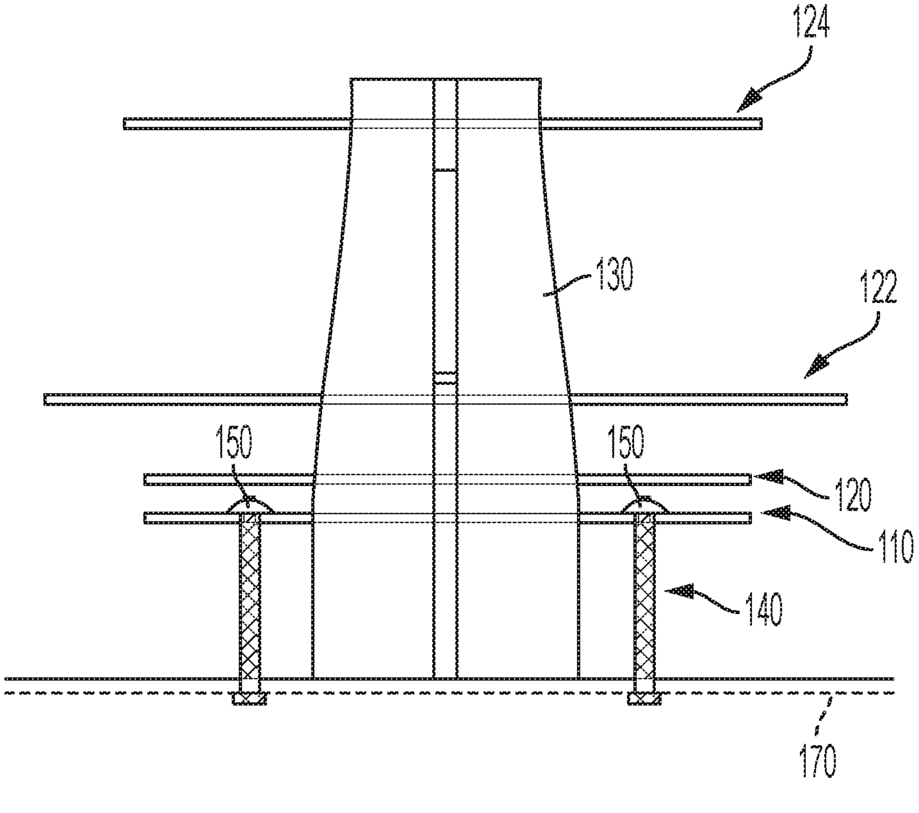
FIG. 1C is a side view of the conventional high frequency radiator of FIG. 1A.
Figure 2:
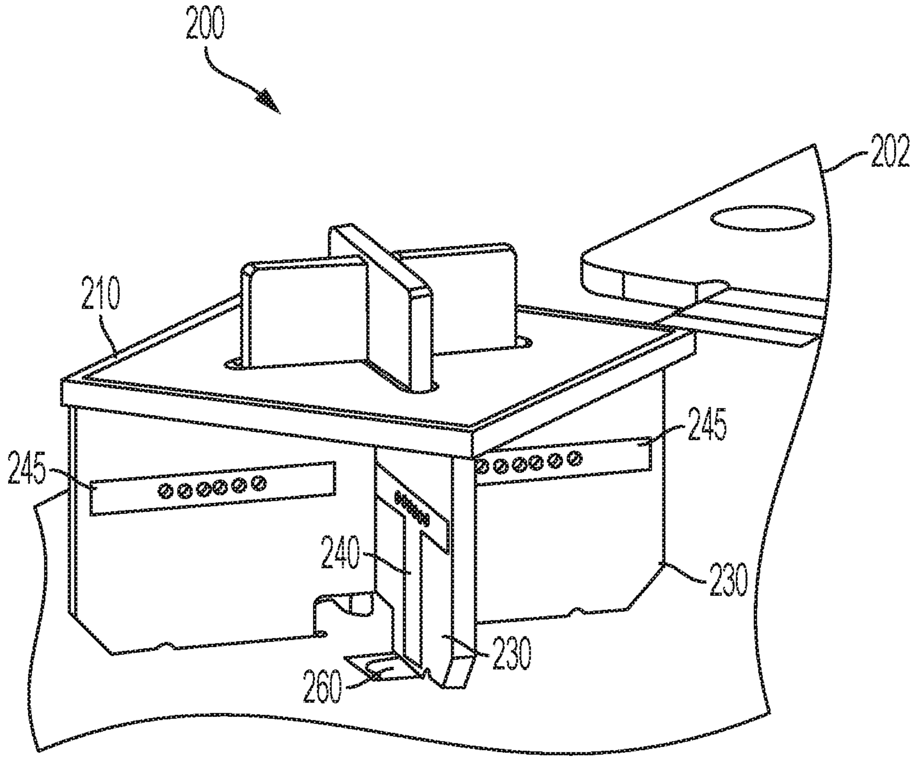
FIG. 2 illustrates a high frequency radiator according to the disclosure.

Reference will now be made in detail to embodiments of the patch antenna design for easy fabrication and controllable performance at high frequency bands with reference to the accompanying figures FIG. 2 illustrates an exemplary high frequency radiator 200 according to the disclosure, disposed on array face PCB 202. High frequency radiator 200 includes a PCB radiator plate 210 that is mounted to two PCB stems 230 that are arranged in an interlocking cross configuration. Disposed on each PCB stem 230 is a feeder metallic trace 240 and an opposing metallic trace 245, each of which is disposed on opposite sides of a corresponding PCB stem 230. Feeder metallic trace 240 is coupled to an RF feeder line (not shown) by solder joint 260.

Figure 3:
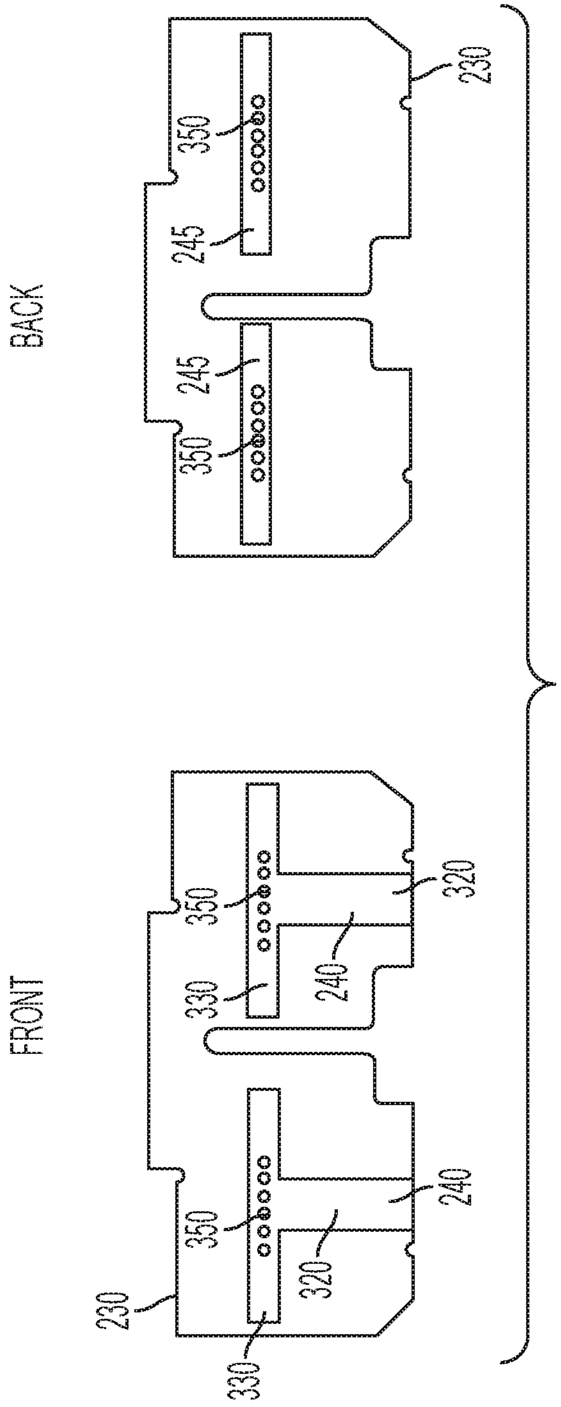
FIG. 3 illustrates two sides of a PCB stem for the high frequency radiator of FIG. 2.

FIG. 3 illustrates two sides of a PCB stem 230, including a front side and a back side. Disposed on the front side of PCB stem 230 are feeder metallic traces 240. Feeder metallic trace 240 has a vertical feeder portion 320 and a horizontal trace portion 330. Disposed on the back side of PCB stem 230 is opposing metallic trace 245. Opposing metallic trace 245 may have a profile (or dimensions) that may substantially overlap with the profile of horizontal trace portion 330 of feeder metallic trace 240. Disposed within both feeder metallic trace 240 and opposing metallic trace 245 is a plurality of vias 350 that penetrate the PCB stem 230 and enable the feeder metallic trace 240 and opposing metallic trace 245 to be electrically coupled using solder or another form of electrical connection. The vias 350 may be disposed horizontally along the profile of horizontal trace portion 330 and opposing metallic trace 245. The location of horizontal trace portion 330 and its corresponding opposing metallic trace 245 along the vertical dimension may be such that RF current flowing in the combination of horizontal trace portion 330, opposing metallic trace 245, and the solder in the vias 350 may impart RF radiation that couples with PB radiator plate 210.

Variations to the PCB stems 230 are possible and within the scope of the disclosure. For example, instead of a single PCB stem 230 with two pairs of feeder metallic traces 240 and opposing metallic traces 245, each feeder metallic trace 240 and opposing metallic trace 245 may have its own PCB stem component, and the two PCB stem components may be physically coupled, or mechanically coupled separately to PCB radiator plate 210. Further, although PCB stem 230 is illustrated with both feeder metallic traces 240 on one side and both opposing metallic traces 245 on the other side, it will be readily understood that each combination of feeder metallic trace 240 and opposing metallic trace 245 may be reversed such that one feeder metallic trace 240 may be on one side of PCB stem 230 and the other feeder metallic trace 240 may be on the other side of PCB stem 230. Also, although PCB stem 230 is illustrated as a single PCB component. PCB stem 230 may be formed of two separate PCB segments, each of which having one combination of feeder metallic trace 240 and opposing metallic trace 245.

Figure 4A:
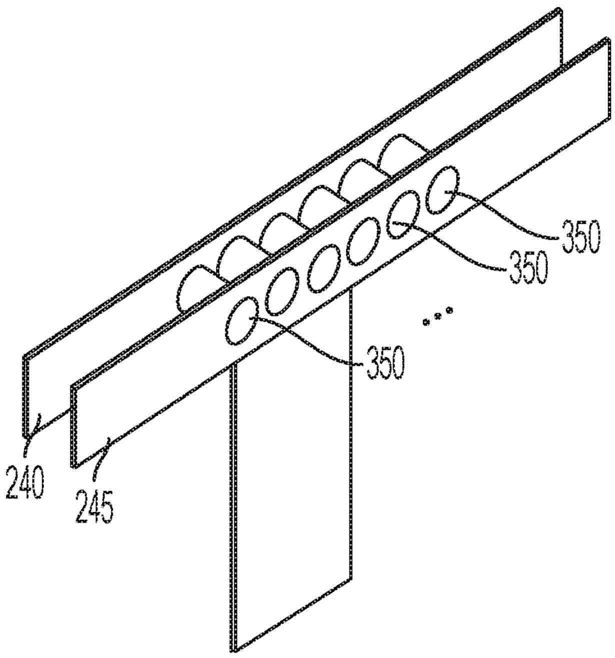
FIG. 4A illustrates front and back metallic traces that are disposed on front and back sides of the PCB stems (with the PCB stem structures removed from the illustration), connected by a plurality of conductive traces that are disposed within vias disposed in the PCB stem structure

FIG. 4A illustrates feeder metallic trace 240 and opposing metallic trace 245 disposed on front and back sides of the PCB stems (with the PCB stem structure removed from the illustration), connected by a plurality of conductive traces that are disposed within vias 350 disposed in the PCB stem structure. Each combination of traces 240 and 245, coupled through corresponding vias 350, provides sufficient volume of conductive material in the proper configuration and proximity to PCB radiator plate 210 to pump sufficient RF flux into PCB radiator plate 210 for high frequency radiator 200 to function with substantially the same efficiency as conventional high frequency radiator 100, but with fewer components. Given the rigidity and interlocking nature of PCB stems 230, high frequency radiator 200 does not need additional support structures that are required for conventional high frequency radiator 100. Further, high frequency radiator 200 only requires four solder joints 260 as opposed to eight.

Additionally, the configuration of feeder metallic trace 240 and opposing metallic trace 245, and their corresponding vias 350, enables the solder points within vias 350 to be done in such a way that they do not protrude toward PCB radiator plate 210, and thus do not cause imprecision in impedance matching as occurs with conventional high frequency radiator 100. In other words, the design of high frequency radiator 200 is tolerant of imprecision in soldering.

Figure 4B:
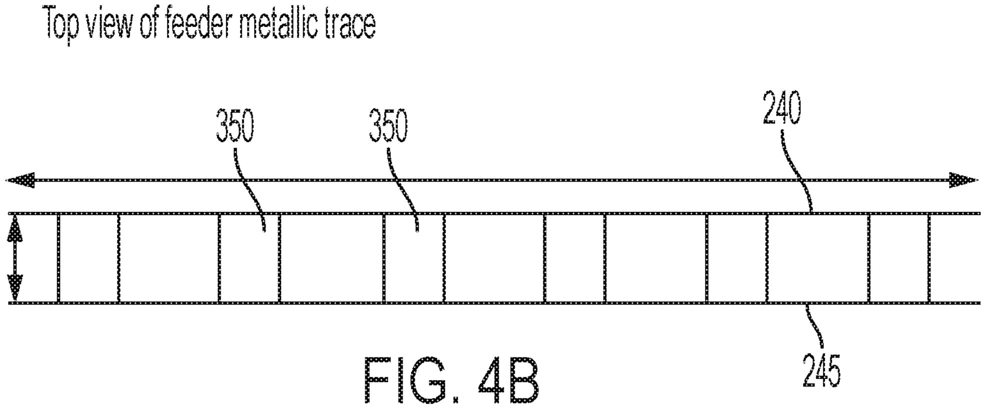
FIG. 4B is a "top down" view of the front and back metallic traces, connected by a plurality of conductive traces disposed within the vias.
Figure 4C:
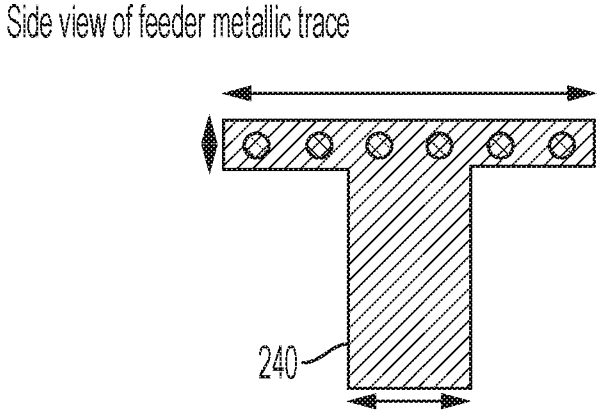
FIG. 4C is a side view of a front metallic trace, along with example dimensions.

FIG. 4B is a "top down" view of feeder metallic trace 240, opposing metallic trace 245, and their corresponding vias 350, and FIG. 4C is a side view of feeder metallic trace 240. Both Figures include exemplary dimensions. The length of metallic traces, width of metallic traces, length of vias (PCB substrate thickness), space among vias, and number of vias may be specifically selected in order to obtain the good impedance matching over the desired frequency bands.

Figure 5A:
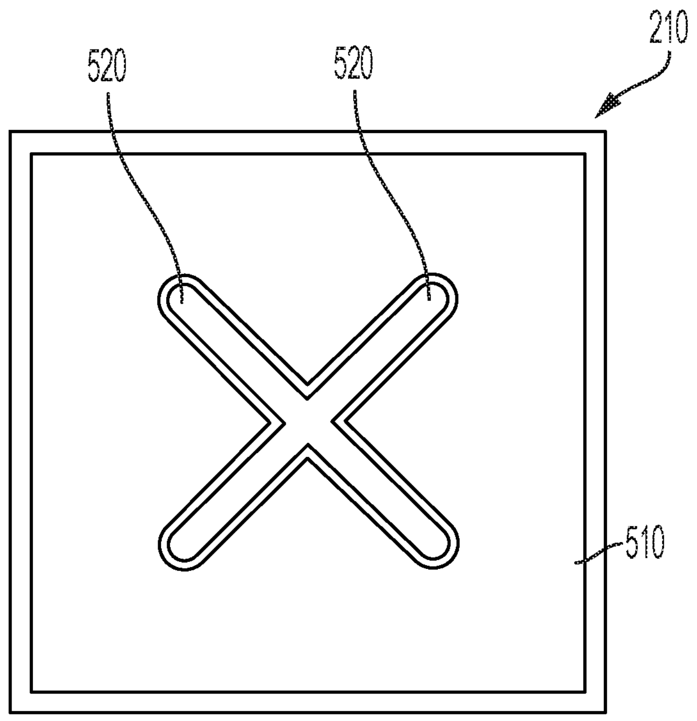
FIG. 5A is a top-down view of the PCB radiator plate of the exemplary high frequency radiator according to the disclosure.

FIG. 5A is a top-down view of the PCB radiator plate 210 of high frequency radiator 200, including metallic plate 510, and a cross aperture 520 through which interlocked PCB stems 230 mechanically engage to support PCB radiator plate 210 and provide mechanical rigidity for high frequency radiator 200.

Figure 5B:
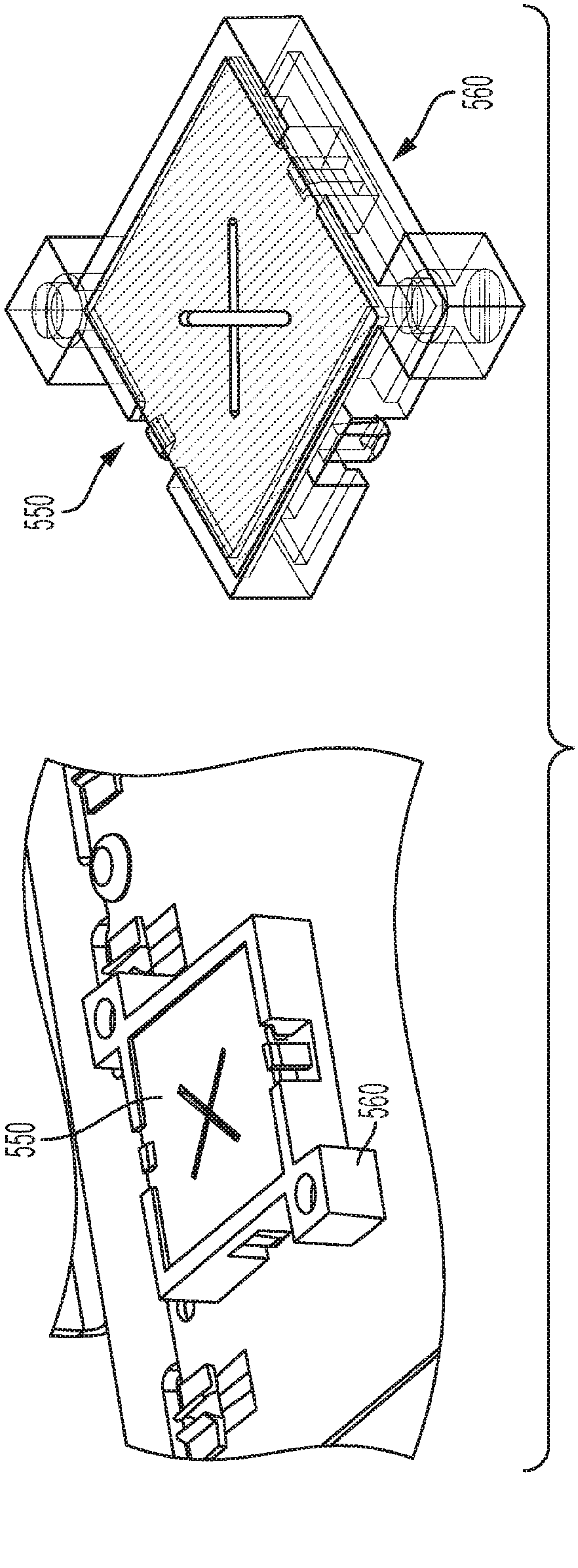
FIG. 5B illustrates an alternative embodiment in which a metallic patch is employed in place of the PCB radiator plate.

FIG. 5B illustrates an alternate embodiment in which a metallic patch 550 is employed in place of PCB radiator plate 210. In order to assure stable and consistent orientation of metallic patch 550, a non-conductive support infrastructure 560 is provided. It will be understood that such variations are possible and within the scope of the disclosure.

Figure 6:
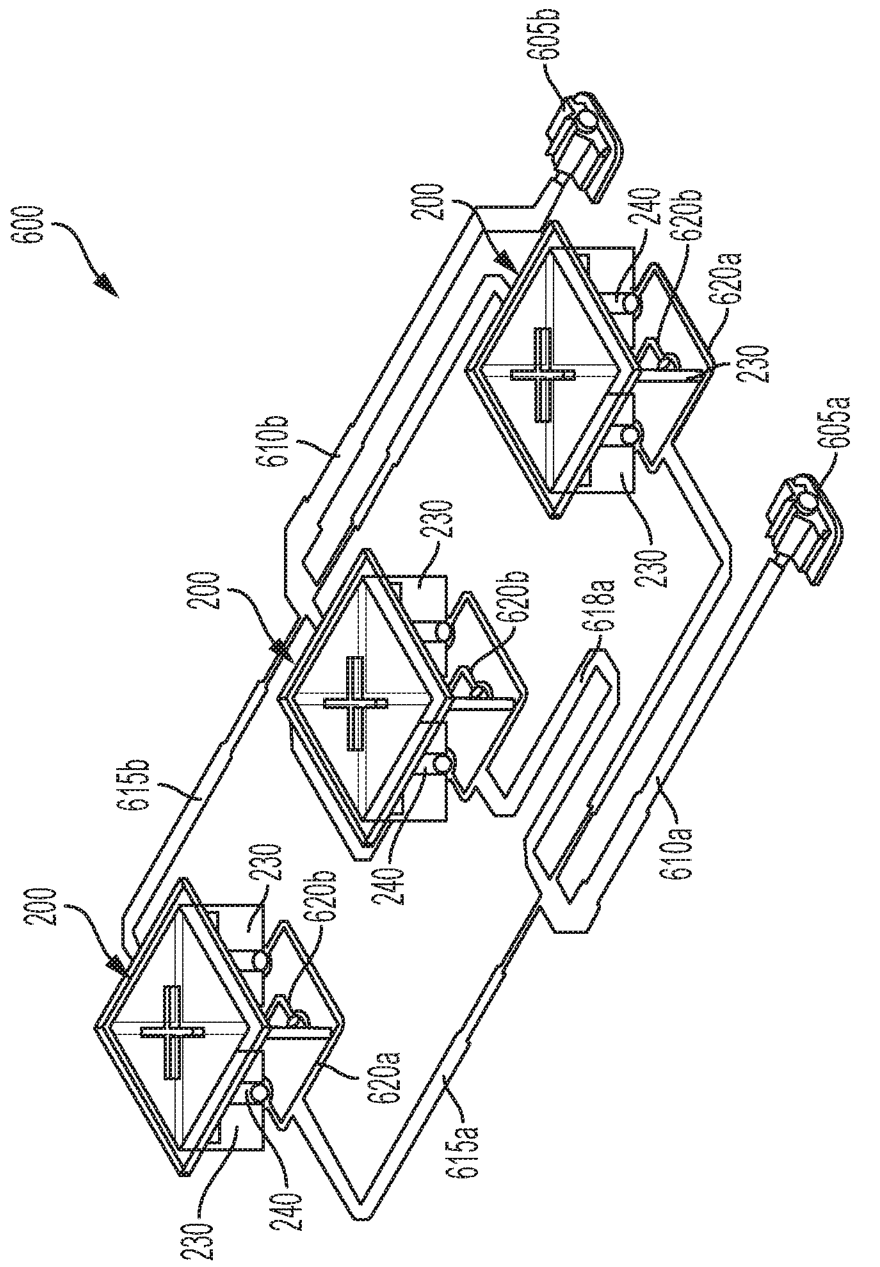
FIG. 6 illustrates an arrangement of exemplary high frequency radiators as they might be configured on an array face.

FIG. 6 illustrates an arrangement of exemplary high frequency radiators 200 as they might be configured on an array face. Illustrated are three high frequency radiators 200 coupled together to two RF signals through RF input ports 605*a/b*, input feeds 610*a/b*, fanned-out feeds 615*a/b*, and phase-split feeds 620*a/b*. Each RF input signal is fed to a pair of feeder metallic traces 240 on one of PCB stems 230. As illustrated, a given RF input signal is split into two phase-split feeds 620*a/b*. Given the difference in length between the split feeds 620*a/b*, the RF signal presented to one feeder metallic trace 240 on a given PCB stem 230 will be substantially 90 degrees phase shifted to the RF signal presented to the other of front side feeder metallic trace 240 on the same PCB stem 240. *Ibis* enables two features for an antenna: (1) it rotates the polarization vector of the emitted RF signal by 45 degrees; and (2) it enables high frequency radiator 200 to operate in a circular polarization mode, by inputting a single RF signal to both RF inputs 605*a/b*, but with a 90-degree phase offset between them.

Figure 7:
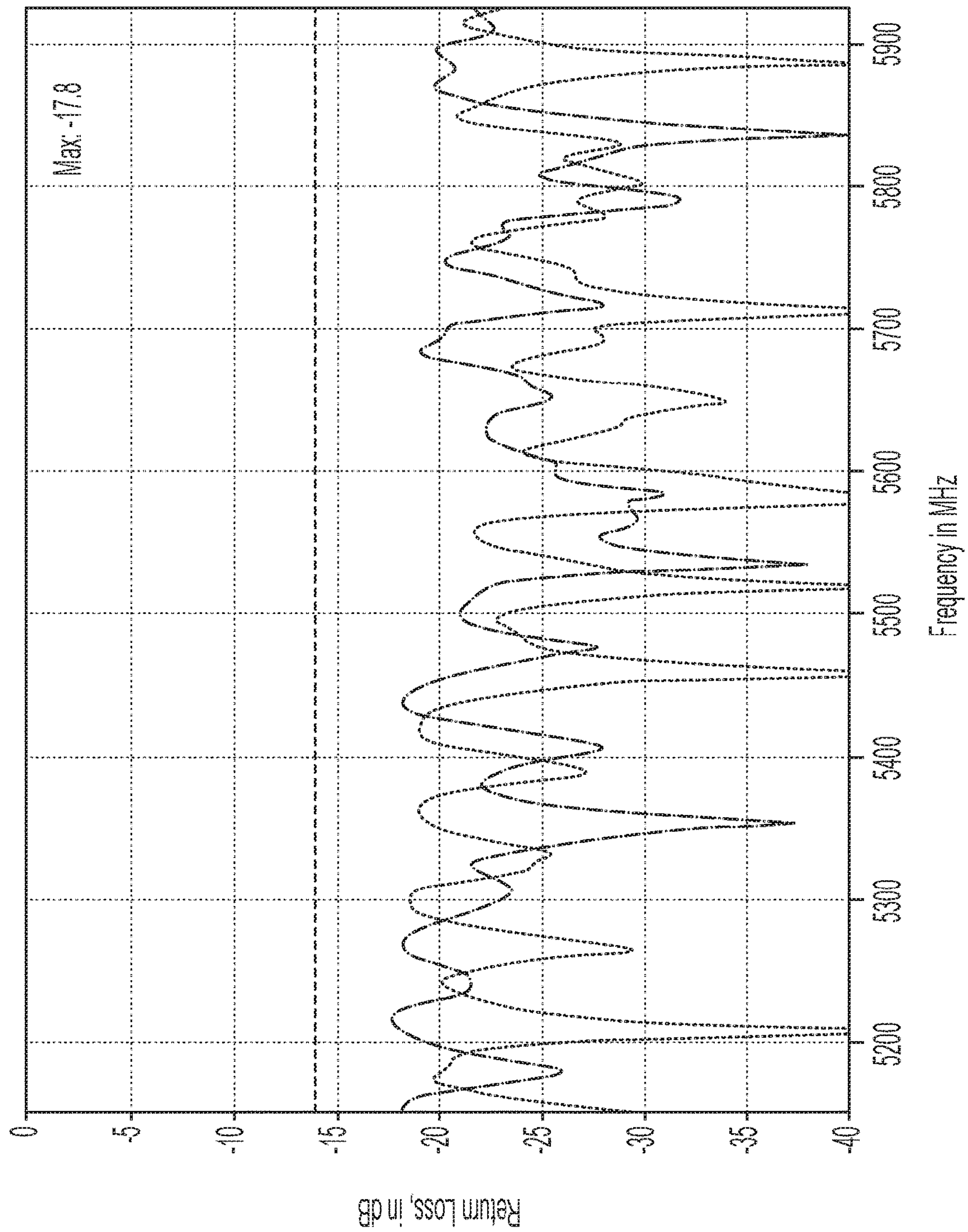
FIG. 7 is an exemplary return loss plot corresponding to the high frequency radiator according to the disclosure.
Figure 8:
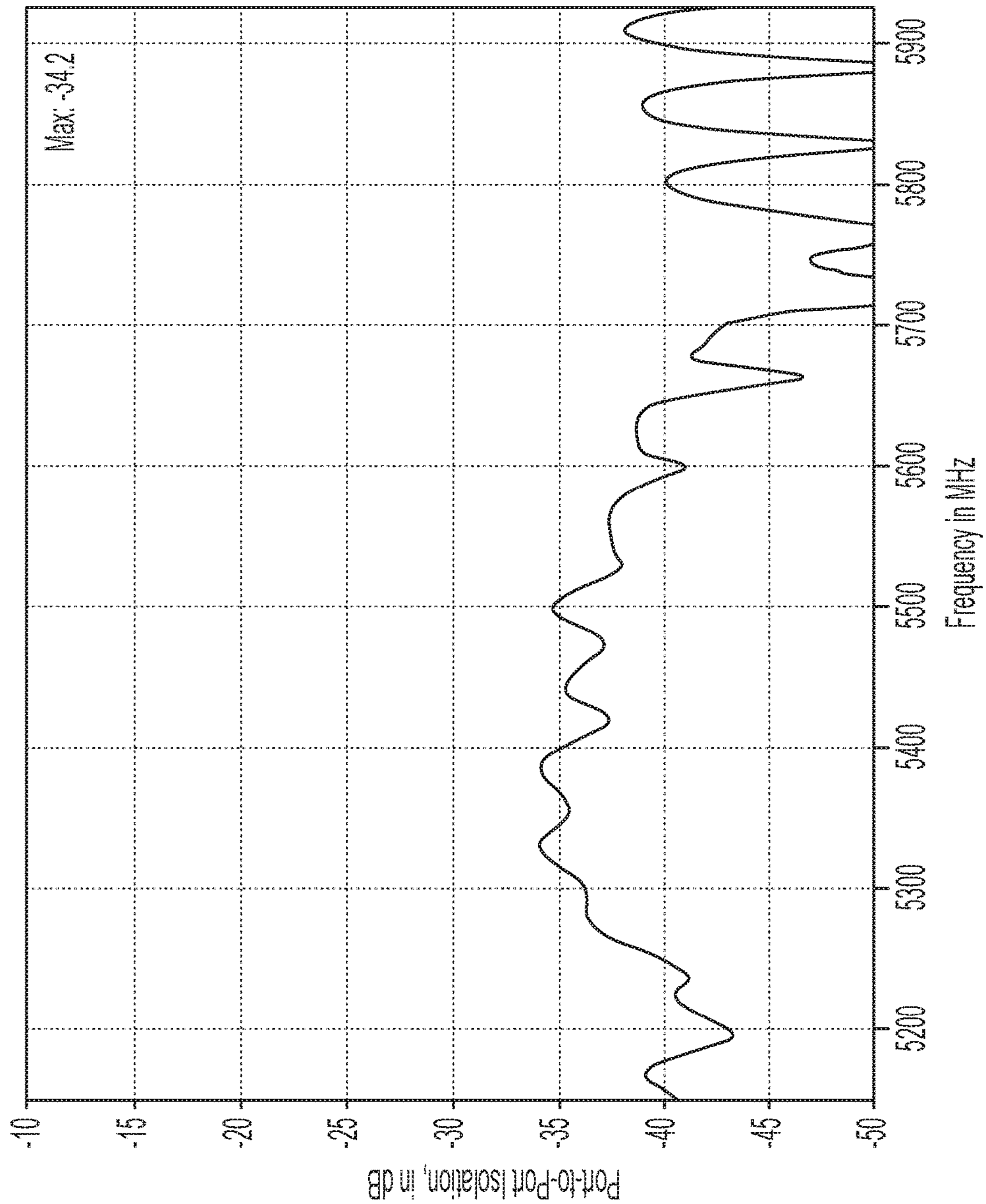
FIG. 8 is an exemplary isolation plot corresponding to the high frequency radiator according to the disclosure.

FIG. 7 is an exemplary measured return loss plot corresponding to the high frequency radiator according to the disclosure, and FIG. 8 is an exemplary measured isolation plot corresponding to the high frequency radiator according to the disclosure, depicting the superior performance of high frequency radiator 200.

Figure 9:
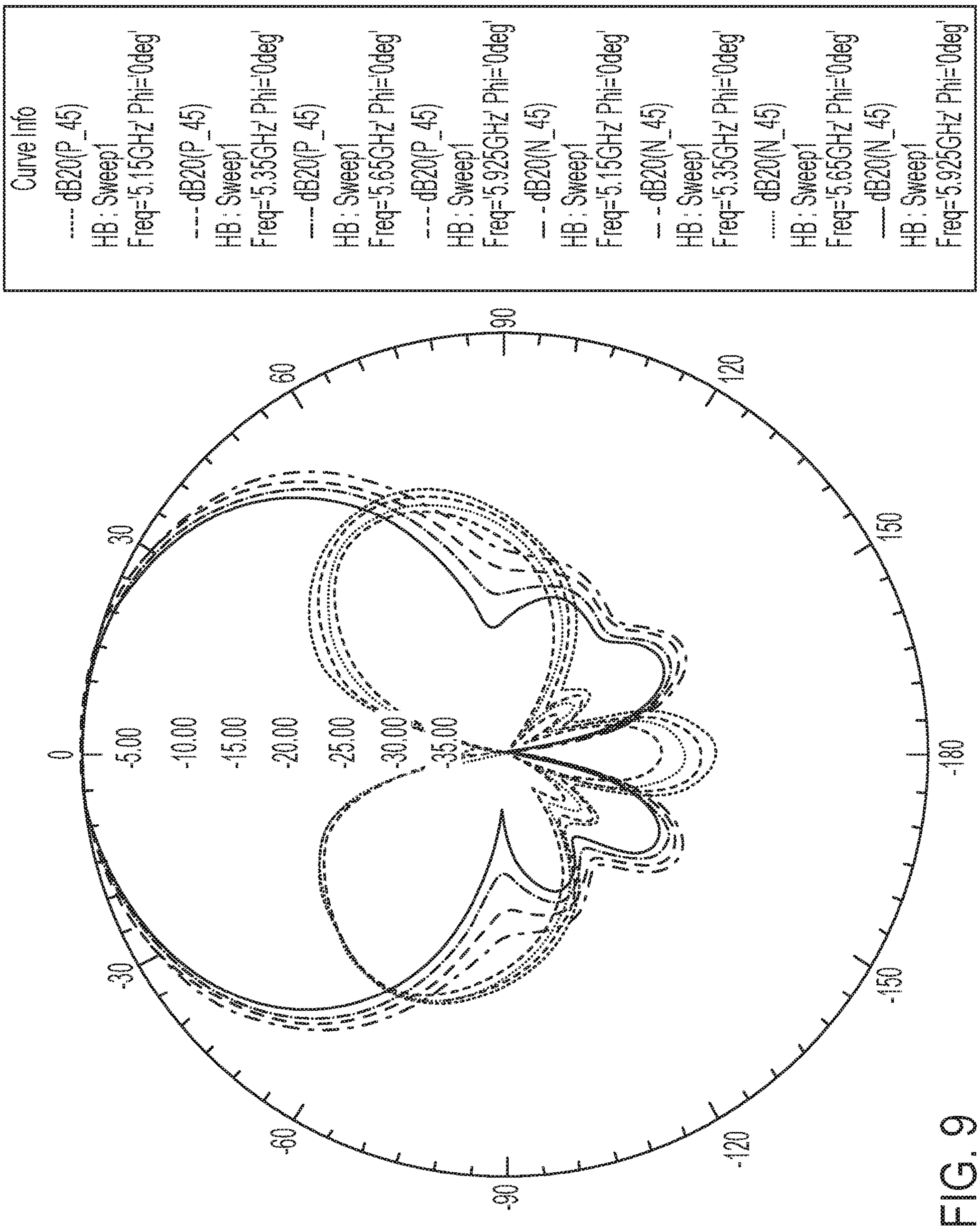
FIG. 9 is an exemplary azimuth radiation pattern corresponding to the high frequency radiator according to the disclosure.
Figure 10:
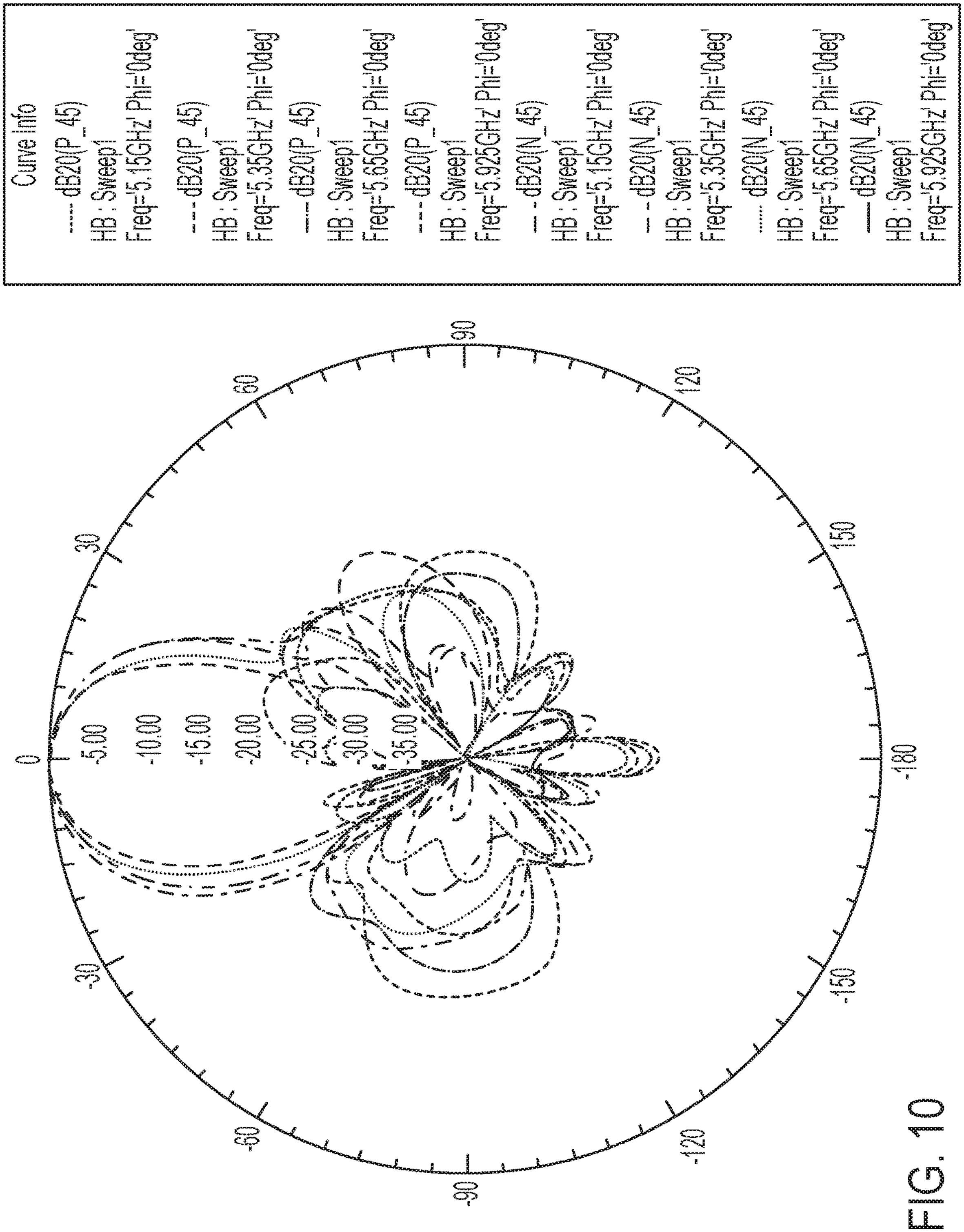
FIG. 10 is an exemplary elevation radiation pattern corresponding to the high frequency radiator according to the disclosure.

FIG. 9 is an exemplary azimuth radiation pattern plot corresponding to the high frequency radiator according to the disclosure, and FIG. 10 is an exemplary azimuth radiation pattern plot corresponding to the high frequency radiator according to the disclosure, depicting the superior performance of high frequency radiator 200. The proposed structures shows the good impedance matching and isolation characteristics which are achievable and controllable.

While various embodiments of the patch antenna design for easy fabrication and controllable performance at high frequency bands have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present invention should not be limited by any of the above-described exemplary embodiments, but should be defined only in accordance with the following claims and their equivalents.

What is claimed is:

1. A radiator for an antenna, comprising:

a pair of PCB stems arranged in an interlocking cross fashion, each of the PCB stems having a front side and a rear side, wherein disposed on each PCB stem front side is a pair of feeder metallic traces, wherein each feeder metallic trace comprises a feeder portion and a horizontal trace portion such that the horizontal trace portion is perpendicular to the feeder portion, wherein disposed on each PCB stem rear side is only a corresponding pair of opposing horizontal metallic traces having a profile that substantially overlaps a profile of a corresponding horizontal trace portion on the front side of the PCB stem, wherein each horizontal trace portion on the front side of the PCB stem and its corresponding opposing horizontal metallic trace on the rear side of the PCB stem is electrically coupled by a plurality of vias through the PCB stem disposed along a profile of the horizontal trace portion, wherein each feeder portion on the front side of the PCB stem is configured to couple to a radio frequency (RF) source; and a radiator plate mechanically coupled to the pair of PCB stems.

2. The radiator of claim 1, wherein the radiator plate comprises:

a PCB substrate; and a metal plate disposed on the PCB substrate.

3. The radiator of claim 1, wherein the radiator plate comprises:

a metal plate; and a non-conducting support infrastructure to which the metal plate is mechanically coupled.

4. The radiator of claim 1, wherein the profile of the horizontal trace portion comprises a length and a width, and wherein each via has a via length, and wherein the length, the width, the via length, spacing between vias, and a quantity of vias, are selected to obtain desired impedance matching over a frequency range.

5. The radiator of claim 1, wherein each PCB stem comprises two PCB segments, each PCB segment having one combination of the feeder metallic trace and the corresponding opposing metallic trace.

6. The radiator of claim 1, wherein the radiator plate comprises a cross-aperture therethrough, wherein an interlocking first PCB stem and second PCB stem of the pair of PCB stems extend through the cross-aperture such that the radiator plate is mechanically coupled to the pair of PCB stems.

7. The radiator of claim 1, wherein each via is formed through the feeder metallic trace and the opposing metallic trace on each PCB stem.

8. An antenna having a plurality of high frequency radiators, each of the high frequency radiators comprises:

a pair of PCB stems arranged in an interlocking cross fashion, each of the PCB stems having a front side and a rear side, wherein disposed on each PCB stem front side is a pair of feeder metallic traces, wherein each feeder metallic trace comprises a feeder portion and a horizontal trace portion such that the horizontal trace portion is perpendicular to the feeder portion, wherein disposed on each PCB stem rear side is only a corresponding pair of opposing horizontal metallic traces having a profile that substantially overlaps a profile of a corresponding horizontal trace portion on the front side of the PCB stem, wherein each horizontal trace portion on the front side of the PCB stem and its corresponding opposing horizontal metallic trace on the rear side of the PCB stem is electrically coupled by a plurality of vias through the PCB stem disposed along a profile of the horizontal trace portion, wherein each feeder portion on the front side of the PCB stem is configured to couple to a radio frequency (RF) source; and a radiator plate mechanically coupled to the pair of PCB stems.

9. The antenna of claim 8, wherein the radiator plate comprises:

a PCB substrate; and a metal plate disposed on the PCB substrate.

10. The antenna of claim 8, wherein the radiator plate comprises:

a metal plate; and a non-conducting support infrastructure to which the metal plate is mechanically coupled.

11. The antenna of claim 8, wherein the profile of the horizontal trace portion comprises a length and a width, and wherein each via has a via length, and wherein the length, the width, the via length, spacing between vias, and a quantity of vias, are selected to obtain desired impedance matching over a frequency range.

12. The antenna of claim 8, wherein each PCB stem comprises two PCB segments, each PCB segment having one combination of the feeder metallic trace and the corresponding opposing metallic trace.

13. The antenna of claim 8, wherein the radiator plate comprises a cross-shaped aperture therethrough, wherein an interlocking first PCB stem and second PCB stem of the pair of PCB stems extend through the cross-shaped aperture such that the radiator plate is mechanically coupled to the pair of PCB stems.

14. The antenna of claim 8, wherein the via is formed through the feeder metallic trace and the opposing metallic trace on each PCB stem.

15. A radiator for an antenna, comprising:

a pair of PCB stems arranged in a cross fashion, each of the PCB stems having:

a front side and a rear side, wherein disposed on each PCB stem front side is a pair of feeder metallic traces, wherein each feeder metallic trace comprises a feeder portion and a horizontal trace portion such that the horizontal trace portion is perpendicular to the feeder portion, wherein disposed on each PCB stem rear side is only a corresponding pair of opposing horizontal metallic traces having a profile that substantially overlaps a profile of a corresponding horizontal trace portion on the front side of the PCB stem, wherein each horizontal trace portion on the front side of the PCB stem and its corresponding opposing metallic trace on the rear side of the PCB stem is electrically coupled by at least one via formed in the PCB stem and disposed along the horizontal trace portion, wherein each feeder portion on the front side of the PCB stem is configured to couple to a radio frequency (RF) source; and a radiator plate comprising a cross-shaped aperture for mechanically mounting the radiator plate to the PCB stems and mechanically coupled to the pair of PCB stems, via the cross-shaped aperture;

wherein the at least one via comprises a plurality of vias disposed between the horizontal trace portion and the corresponding opposing metallic trace.

* * * * *